(12) United States Patent
Hwang et al.

(10) Patent No.: US 10,872,506 B2
(45) Date of Patent: Dec. 22, 2020

(54) AUTOMATED TELLER MACHINE

(71) Applicant: HYOSUNG TNS INC., Seoul (KR)

(72) Inventors: Jin Young Hwang, Seoul (KR);
Kyoung Soo Kim, Gyeonggi-do (KR);
Seok Won Kim, Gyeonggi-do (KR);
Seung Soo Lee, Gyeonggi-do (KR);
Hye Bin Oh, Incheon (KR); Young
Dae Seo, Daegu (KR)

(73) Assignee: HYOSUNG TNS INC., Seoul (KR)

( * ) Notice: Subject to any disclaimer, the term of this
patent is extended or adjusted under 35
U.S.C. 154(b) by 0 days.

(21) Appl. No.: 16/423,273

(22) Filed: May 28, 2019

(65) Prior Publication Data
US 2020/0202678 A1 Jun. 25, 2020

(30) Foreign Application Priority Data
Dec. 19, 2018 (KR) .................. 10-2018-0165689
Mar. 8, 2019 (KR) .................. 10-2019-0027041

(51) Int. Cl.
G07F 19/00 (2006.01)
F16H 21/44 (2006.01)
(Continued)

(52) U.S. Cl.
CPC ........... G07F 19/203 (2013.01); F16H 21/44
(2013.01); F16H 25/18 (2013.01); F16H
37/12 (2013.01); G07F 19/202 (2013.01)

(58) Field of Classification Search
CPC .... G06Q 20/1085; G07D 11/00; G07D 11/12;
G07F 19/00; G07F 19/20
(Continued)

(56) References Cited

U.S. PATENT DOCUMENTS 5,267,826 A * 12/1993 Peters .................. B65H 29/12
414/789.9
2006/0097444 A1* 5/2006 Spinetti ............... B65H 29/006
271/216
(Continued)

FOREIGN PATENT DOCUMENTS

EP 1 359 103 A1 11/2003
EP 1 434 178 A2 6/2004
(Continued)

OTHER PUBLICATIONS

Korean Office Actions dated Mar. 18, 2020 issued in corresponding Korean Patent Application No. 10-2018-0165689.
(Continued)

Primary Examiner — Edwyn Labaze
(74) Attorney, Agent, or Firm — Bacon & Thomas, PLLC

(57) ABSTRACT

An automated teller machine comprises a main body including a customer service unit where a medium is inserted and taken out and a deposit/withdrawal unit where a medium is separated and stacked, and a tray configured to transfer the medium while reciprocating between the deposit/withdrawal unit and the customer service unit. The tray includes a tray body that is movable between the customer service unit and the deposit/withdrawal unit, a clamping plate provided at the tray body to be vertically movable to clamp the medium inserted into the tray body, and a clamping lever configured to move the clamping plate upward so that a medium stacking space into which the medium is inserted is generated in the tray body.

11 Claims, 11 Drawing Sheets

(51) Int. Cl.
*F16H 25/18* (2006.01)
*F16H 37/12* (2006.01)

(58) Field of Classification Search
USPC .............................. 235/379, 375; 705/35–45
See application file for complete search history.

(56) References Cited

U.S. PATENT DOCUMENTS

| | | | | |
|---|---|---|---|---|
| 2011/0031308 A1* | 2/2011 | Holland-Letz | ......... | B65H 1/022 |
| | | | | 235/379 |
| 2012/0280034 A1 | 11/2012 | Cha et al. | | |
| 2014/0061222 A1* | 3/2014 | Allan | ...................... | G07D 11/00 |
| | | | | 221/219 |
| 2014/0131163 A1 | 5/2014 | Yun et al. | | |
| 2014/0209435 A1* | 7/2014 | Carlisle | .................. | B65G 15/14 |
| | | | | 198/604 |
| 2015/0114795 A1* | 4/2015 | Roxa | ...................... | G07D 11/10 |
| | | | | 194/344 |
| 2019/0291982 A1* | 9/2019 | Hwang | .................. | B65H 31/26 |

FOREIGN PATENT DOCUMENTS

| | | |
|---|---|---|
| EP | 2 469 483 A1 | 6/2012 |
| EP | 3 185 222 A1 | 6/2017 |
| JP | 2016-057687 A | 4/2016 |
| KR | 10-2010-0079664 A | 7/2010 |
| KR | 10-2011-0083164 A | 7/2011 |
| KR | 10-1090320 B1 | 12/2011 |
| KR | 10-2014-0077440 A1 | 6/2014 |

OTHER PUBLICATIONS

Extended European Search Report dated May 7, 2020 issued in corresponding European Application No. 19207930.1.

* cited by examiner

AUTOMATED TELLER MACHINE

CROSS-REFERENCE TO RELATED APPLICATIONS

This application is based on and claims priority from Korean Patent Application Nos. 10-2018-0165689 and 10-2019-0027041 respectively filed on Dec. 19, 2018 and Mar. 8, 2019, the disclosures of which are incorporated herein in their entirety by reference for all purposes.

FIELD OF THE INVENTION

The present disclosure relates to an automated teller machine (ATM).

BACKGROUND OF THE INVENTION

Recently, the ATM is widely used not only in financial institutions such as banks but also in convenience stores, department stores, and public places. The ATM may be classified into a withdrawal machine, a deposit machine, and a deposit and withdrawal machine depending on whether a transaction is a deposit or a withdrawal. Recently, the ATM is variously used for cash deposit/withdrawal, check deposit/withdrawal, passbook update, electronic bill payment, ticket sales, and the like.

A conventional ATM can be classified into two types depending on an insertion type of a medium such as cash or check. One is a pocket type in which a deposit/withdrawal unit has a pocket shape and allows a user to insert a medium into a pocket. The other one is a present type in which a bill is inserted or withdrawn through a slot formed at the deposit/withdrawal unit. In the case of the pocket type, a user needs to insert a hand into the pocket to insert a medium for deposit. However, depending on a user's culture, a user often minds putting a part of a body into a machine. Therefore, the present type in which a user can deposit/withdraw a medium without inserting a hand into the deposit/withdrawal unit can be applied as a solution to the problem of the pocket type. However, the present type is disadvantageous in that it is weak in security and the number of media that can be deposited/withdrawn at one time is limited. Thus, a user who wants to deposit/withdraw a large amount of media at one time feels uncomfortable.

Although there have been attempts to combine the pocket type and the present type to solve the problems of the two types, it is still far from practical application due to a complicated structure and lack of practicality.

Therefore, there is a demand for research on a deposit/withdrawal unit having an innovative structure capable of solving the problems of the pocket type and the present type. (Patent Document 1) Korean Patent Registration No. 10-1094499 (registered on Dec. 8, 2011)

SUMMARY OF THE INVENTION

In view of the above, the present disclosure provides an automated teller machine (ATM) capable of solving the problems of the pocket type and the present type and allowing effective vertical movement of a clamping plate.

In accordance with an aspect, there is provided an automated teller machine comprising: a main body including a customer service unit where a medium is inserted and taken out and a deposit/withdrawal unit where a medium is separated and stacked; and a tray configured to transfer the medium while reciprocating between the deposit/withdrawal unit and the customer service unit, wherein the tray includes: a tray body that is movable between the customer service unit and the deposit/withdrawal unit; a clamping plate provided at the tray body to be vertically movable to clamp the medium inserted into the tray body; and a clamping lever configured to move the clamping plate upward so that a medium stacking space into which the medium is inserted is generated in the tray body.

The automated teller machine may further comprise a link unit configured to move the clamping lever, wherein the link unit includes: a link member provided at the main body such that at least a part of the link member selectively supports the clamping lever; and a driving cam configured to lift/lower the link member.

The driving cam may include a guide groove formed in a spiral shape toward a center of rotation of the driving cam to guide the lifting/lowering of the link member during the rotation of the driving cam.

The clamping plate may include an elevation protrusion that projects from a side portion thereof to be lifted by the clamping lever.

The clamping lever may be hinge-coupled to the tray body so that at least a part of the clamping lever supports the elevation protrusion.

The clamping lever may include a lever protrusion that projects from a side portion thereof to be supported by the link member.

The main body may include a guide bracket projecting on a movement path of the tray body, wherein a height of the clamping plate is restricted to a preset height or less when the tray body is moved by the guide bracket.

In accordance with another aspect, there is provided an automated teller machine comprising: a main body including a customer service unit where a medium is inserted and taken out and a deposit/withdrawal unit where a medium is separated and stacked; and a tray configured to transfer the medium while reciprocating between the deposit/withdrawal unit and the customer service unit, wherein the tray includes: a tray body that is movable between the customer service unit and the deposit/withdrawal unit; a clamping plate provided at the tray body to be vertically movable to clamp the medium inserted into the tray body; and a clamping lever having a gripping groove for restricting at least a part of the clamping plate to move the clamping plate upward and downward.

The main body may include a height restriction bracket projecting on a movement path of the tray body to restrict a rotation height of the clamping lever to a preset height or less.

The clamping plate may include an elevation protrusion that projects from a side portion thereof to be lifted by the clamping lever.

The clamping lever may have one end hinge-coupled to the tray body and the other end having the gripping groove that restricts the elevation protrusion.

The main body may further include an elevation unit configured to operate the clamping lever at the customer service unit.

The elevation unit may include: a link member provided at the main body such that at least a part of the link member selectively supports the clamping lever; a rack piece that is movable in a horizontal direction and provides an inclined surface along which the link member is moved up/down; and a pinion gear configured to move the rack piece.

The clamping lever may include a lever protrusion that projects from a side portion thereof to be supported by the link member.

Effect of the Invention

In accordance with the embodiments of the present disclosure, it is possible to solve the problem of the conventional pocket type in which a part of a user's body needs to be inserted into the device and the problem of the conventional present type in which the security is weak and the amount of media that can be deposited/withdrawn at one time is limited, and the commercialization can be easily achieved due to a simple structure.

Further, in accordance with the embodiments of the present disclosure, the vertical movement of the clamping plate is simply performed using the link unit and, thus, a medium inserted into the tray body can be effectively clamped.

Further in accordance with the embodiments of the present disclosure, even when a medium is overloaded in the tray, it is possible to maintain the height of the clamping plate at a low level by the guide bracket and, thus, the tray can move along the movement path without interference between the clamping plate and neighboring devices and the falling of the medium due to the weak pressing force of the clamping plate can be prevented in advance.

Further, in accordance with the embodiments of the present disclosure, the clamping plate is restricted by the spanner-type clamping lever and, thus, the vertical movement of the clamping plate can be effectively performed and the medium inserted into the tray body can be effectively clamped.

Further, in accordance with the embodiments of the present disclosure, the rotation height of the clamping lever can be maintained at a constant level by the height restriction bracket and, thus, the tray can move along the movement path without interference between the clamping plate and neighboring devices, and the falling of the medium due to the weak pressing force of the clamping plate can be prevented in advance.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
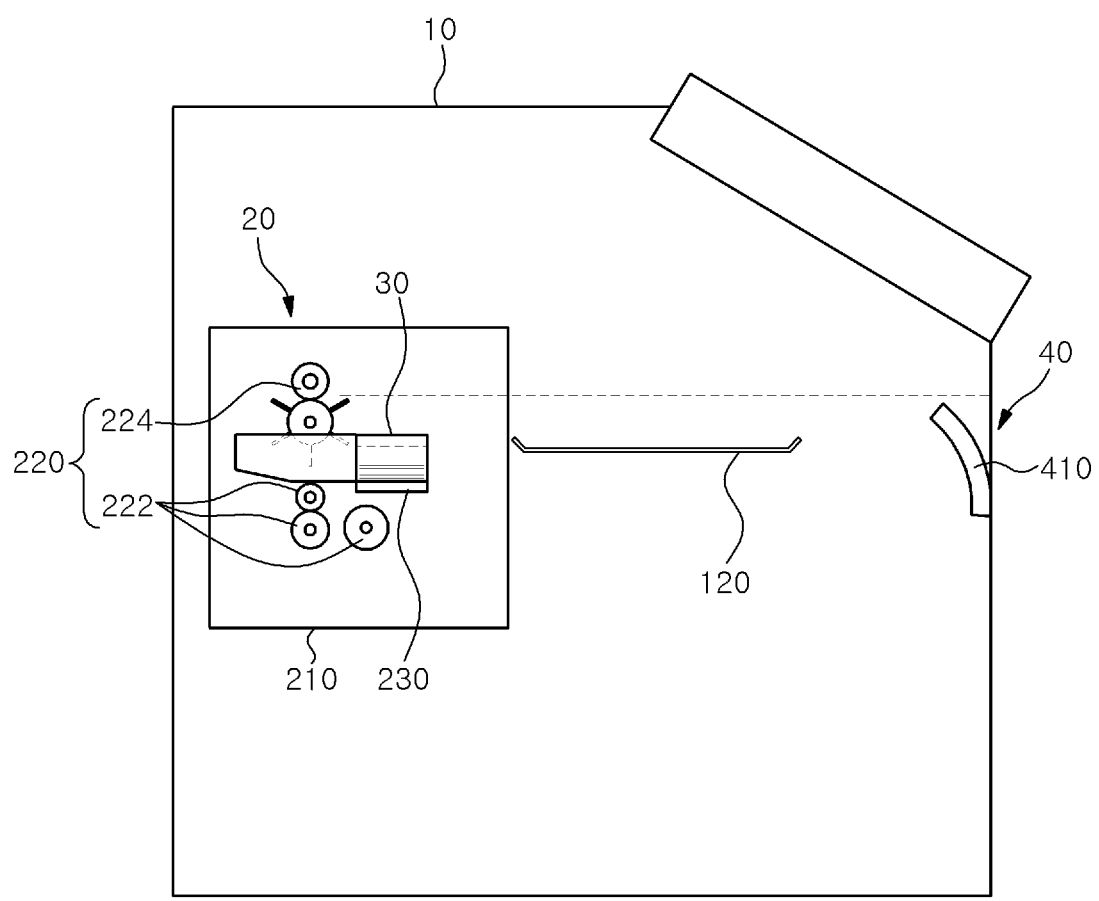
FIG. 1 is a conceptual diagram of an automated teller machine (ATM) according to a first embodiment of the present disclosure.

Hereinafter, configurations and operations of embodiments will be described in detail with reference to the accompanying drawings. The following description is one of various patentable aspects of the disclosure and may form a part of the detailed description of the disclosure. In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another. When it is said that a component is "coupled" or "linked" to another component, it should be understood that the former component may be directly connected or linked to the latter component or a third component may be interposed between the two components. Specific terms used in the present application are used simply to describe specific embodiments without limiting the disclosure. An expression used in the singular encompasses the expression of the plural, unless it has a clearly different meaning in the context.

Hereinafter, a first embodiment of the present disclosure will be described in detail with reference to the accompanying drawings.

As shown in 1, an automated teller machine (ATM) 1 according to the first embodiment of the present invention may include a main body 10, a customer service unit 40, a deposit/withdrawal unit 20, and a tray 30.

Specifically, the main body 10 forms an outer shape of the ATM 1, and can provide a customer service port 11 on a front side. Here, the customer service port 11 may be understood as a customer service space prepared for inserting or receiving media such as banknotes or checks.

The customer service unit 40, the deposit/withdrawal unit 20, and the tray 30 may be provided in the main body 10. A movement path L on which the tray 30 can reciprocate may be provided between the deposit/withdrawal unit 20 and the customer service unit 40.

The customer service unit 40 may be provided at the front side of the main body 10 to facilitate user's deposit/withdrawal. In the customer service unit 40, a medium can be inserted into or taken out of the ATM 1 through the customer service port 11. The customer service unit 40 may include a deposit/withdrawal shutter 410 for opening/closing the customer service port 11.

The deposit/withdrawal unit 20 may be provided in the main body 10 to separate and stack media to be deposited/withdrawn. The deposit/withdrawal unit 20 may include a housing 210, a separating/stacking module 220, and a lifting module 230.

For example, the housing 210 may be provided in the main body 10, and the separating/stacking module 220 may be provided in the housing 210. The separating/stacking module 220 may include a separating roller 222 and a stacking roller 224. The separating roller 222 can separate media transferred by the tray 30, and the stacking roller 224 can stack in the tray 30 a rejected medium or a medium to be withdrawn among the media separated by the separating roller 222.

The lifting module 230 may be provided in the housing 210 to selectively move the tray 30 in a vertical direction. Due to the vertical movement of the lifting module 230, the media stacked in the tray 30 can be transferred along the transfer path in the main body 10. Further, the media in the main body 10 can be moved to a position where the media can be stacked in the tray 30 by the lifting module 230.

The tray 30 can transfer a medium in the main body 10 while reciprocating between the deposit/withdrawal unit 20 and the customer service unit 40. The tray 30 can transfer a medium received from a customer at the customer service unit 40 to the deposit/withdrawal unit 20, and store the media separated by the separating roller 222 in an additional storage unit (not shown) in the ATM 1. Further, the tray 30 can transfer a medium to be withdrawn at the deposit/withdrawal unit 20 to the customer service unit 40 and deliver the medium to a customer.

Figure 2:
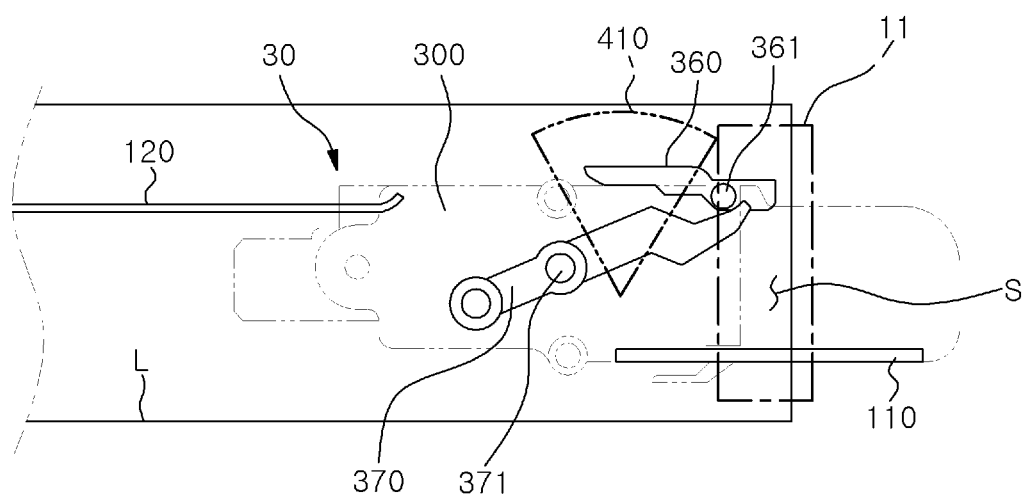
FIG. 2 is an enlarged side view of a tray of the ATM according to the first embodiment of the present disclosure.

As shown in FIG. 2, the tray 30 may include a tray body 300, a clamping plate 360, and a clamping lever 370.

The tray body 300 can reciprocate in a horizontal direction along the movement path L of the main body 10. At this time, a bottom plate 110 for stacking a medium may be provided on a bottom surface of the tray body 300.

The clamping plate 360 may be provided at the tray body 300 to be vertically movable. At this time, the clamping plate 360 may be disposed to face the bottom plate 110 provided at the bottom portion of the tray body 300, and an elevation protrusion 361 supported by the clamping lever 370 may project from the clamping plate 360.

Figure 3:
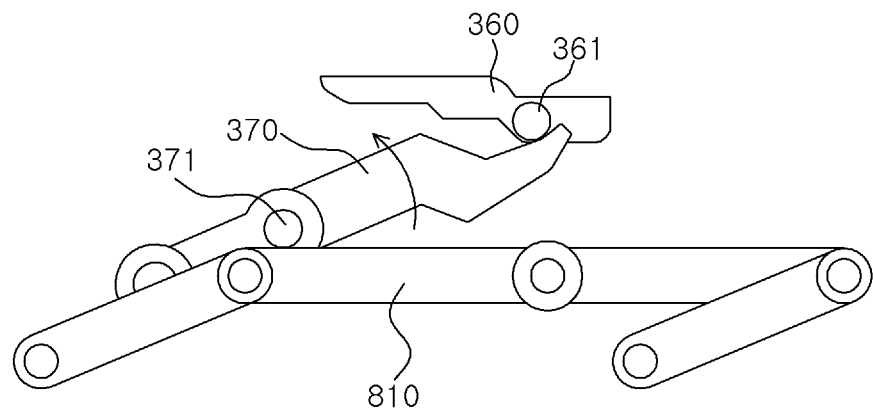
FIG. 3 shows a state in which a clamping plate is lifted by a clamping lever in the tray of the ATM according to the first embodiment of the present disclosure.
Figure 4:
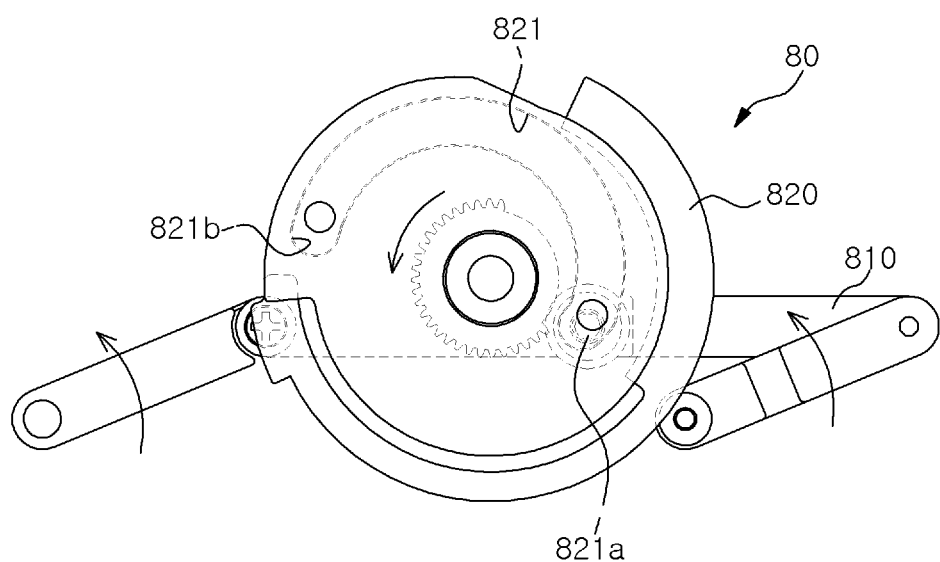
FIG. 4 shows a state in which a link member is lifted to lift the clamping lever in the ATM according to the first embodiment of the present disclosure.

As shown in FIGS. 3 to 4, the elevation protrusion 361 supported by the clamping lever 370 may project from the clamping plate 360. Therefore, if the clamping lever 370 is rotated upward (in a counterclockwise direction in FIG. 3) by a link member 810 of a link unit 80 in a state where the elevation protrusion 361 of the clamping plate 360 is supported by the clamping lever 370, the clamping plate 360 can be moved to a position above the tray body 300. At this time, a medium stacking space S can be generated in a space between the clamping plate 360 and the bottom plate 110 (see FIG. 2.)

The clamping plate 360 can press and clamp the media stacked in the medium stacking space S by the self-weight. For example, if the link member 810 of the link unit 80 is rotated downward (in a clockwise direction in FIG. 7) and the clamping lever 370 is rotated downward (in a clockwise direction in FIG. 6) in a state where the media are stacked in the medium stacking space S, the clamping plate 360 can clamp the media stacked in the media stacking space S by the self-weight.

One end of the clamping lever 370 can be hinge-coupled to the tray body 300, and the other end of the clamping lever 370 can support the elevation protrusion 361 of the clamping plate 360. The clamping lever 370 may include a lever protrusion 371 projecting from a side portion thereof to be supported by the link member 810 of the link unit 80.

Accordingly, if the clamping lever 370 is rotated in the counterclockwise direction in FIG. 3 in a state where the other end of the clamping lever 370 supports the elevation protrusion 361 of the clamping plate 360, the clamping plate 360 can be moved to a position above the tray body 300. The operation of the clamping lever 370 can be implemented by the link unit 80.

Figure 5:
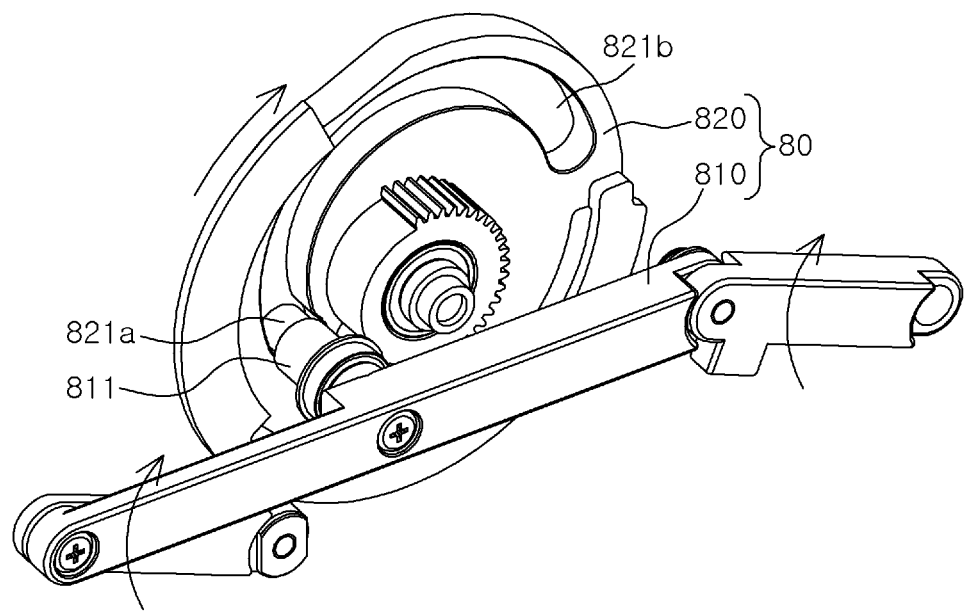
FIG. 5 is a perspective view of a supporting groove of a driving cam at the time of lifting the link member in FIG. 4.
Figure 6:
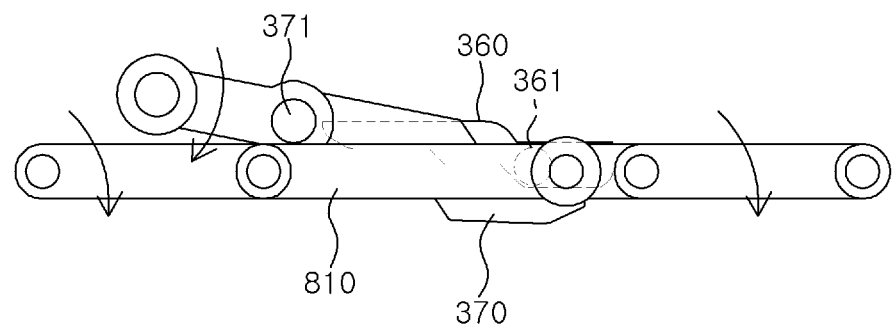
FIG. 6 shows a state in which the clamping plate is lowered by the clamping lever in the tray of the ATM according to the first embodiment of the present disclosure.
Figure 7:
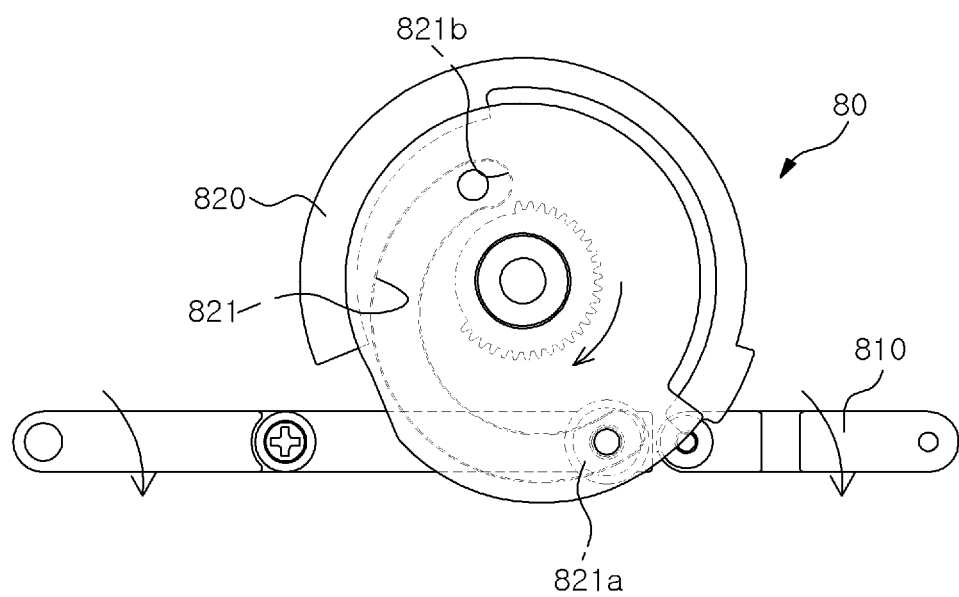
FIG. 7 shows a state in which the link member is lowered to lower the clamping lever in the ATM according to the first embodiment of the present disclosure.

As shown in FIGS. 5 to 7, the link unit 80 may include the link member 810 provided in the form of three-bar linkage on the movement path L of the main body 10, and a driving cam 820 for vertically moving the link member 810, and an actuator (not shown) for rotating the driving cam 820.

Here, at least a part of the link member 810 can support the elevation protrusion 361 of the clamping lever 370. A link protrusion 811 may project from the link member 810. The actuator can rotate the driving cam 820 at a predetermined angle. A guide groove 821 along which the link protrusion 811 of the link member 810 can move during the rotation may be formed at one side surface of the driving cam 820. The guide groove 821 is formed in a spiral shape toward the center of rotation of the driving cam 820. Therefore, the link member 810 can be lifted/lowered by moving the link protrusion 811 during the rotation of the driving cam 820.

For example, if the driving cam 820 is rotated in a counterclockwise direction in FIG. 4 by the operation of the actuator, the link protrusion 811 of the link member 810 is moved from one end 812b to the other end 821b of the guide groove 821. Accordingly, the link member 810 can be rotated upward in a counterclockwise direction as shown in FIG. 5.

On the other hand, if the driving cam 820 is rotated in the clockwise direction in FIG. 7 by the operation of the actuator, the link protrusion 811 of the link member 810 is moved from the other end 821a to one end 821b of the guide groove 821. Accordingly, the link member 810 can be lowered as shown in FIG. 7.

Referring back to FIG. 2, a guide bracket 120 for restricting a height of the clamping plate 360 during the movement of the tray 30 below a preset height may be provided on the movement path L of the main body 10. The guide bracket 120 may project to an inner side of the movement path L to guide at least a part of the clamping plate 360 to the preset height or less.

Therefore, even when the clamping plate 360 is positioned higher than the preset height due to overloading of the media in the tray 30, if the tray 30 passes through the guide bracket 120 on the movement path L, the clamping plate 360 is lowered along the tray body 300 while being guided by the guide bracket 120. Accordingly, the height of the clamping plate 360 can be maintained at a low level in a state where the clamping plate 360 presses the medium. As a result, the tray 30 can move along the movement path L without interference between the clamping plate 360 and neighboring devices, and the falling of the medium due to the weak pressing force of the clamping plate 360 can be prevented in advance.

Hereinafter, the operation and the effect of the ATM configured as described above will be described.

First, in a state where the tray body 300 is moved to the customer service port 11, the tray main body 300 can provide a media stacking space S so that a medium can be deposited through the customer service port 11.

For example, if the driving cam 820 is rotated (in the counterclockwise direction in FIG. 4) by the operation of the actuator in a state where the tray body 300 is moved to the customer service port 11 of the customer service unit, the link protrusion 811 of the link member 810 is moved from one end 821b to the other end 821a of the guide groove 821, thereby lifting the link member 810.

At this time, the clamping lever 370 is rotated upward (in the counterclockwise direction in FIG. 3) by the upward rotation of the link member 810. Accordingly, the clamping plate 360 can be moved to a high position in the tray body 300 as shown in FIG. 2. When the clamping plate 360 is lifted, the medium stacking space S can be generated in the space between the clamping plate 360 and the bottom plate 110.

Then, if a medium is inserted into the medium stacking space S of the tray body 300, the medium inserted into the medium stacking space S can be clamped by the clamping plate 360.

For example, as shown in FIG. 7, if the driving cam 820 is rotated (in the clockwise direction in FIG. 7) by the operation of the actuator, the link protrusion 811 of the link member 810 is moved from the other end 821a to one end 821b of the guide groove 821, thereby lowering the link member 810.

Figure 8:
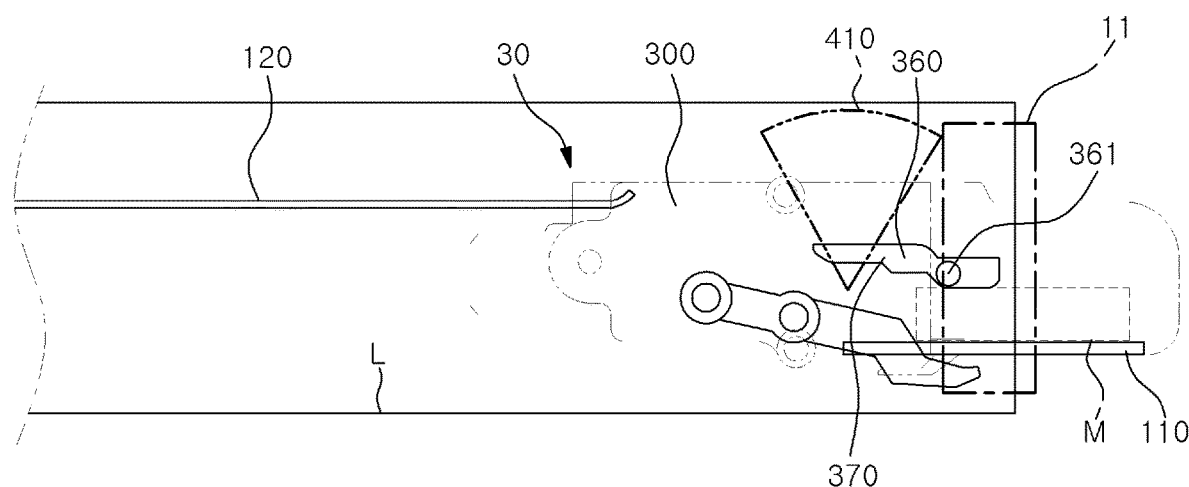
FIG. 8 shows a state in which a medium is clamped to the tray of the ATM according to the first embodiment of the present disclosure.

At this time, the clamping lever 370 is rotated downward (in the clockwise direction in FIG. 6) by the downward rotation of the link member 810, and the clamping plate 360 can clamp a medium in the medium stacking space S by the self-weight as shown in FIG. 8.

Figure 9:
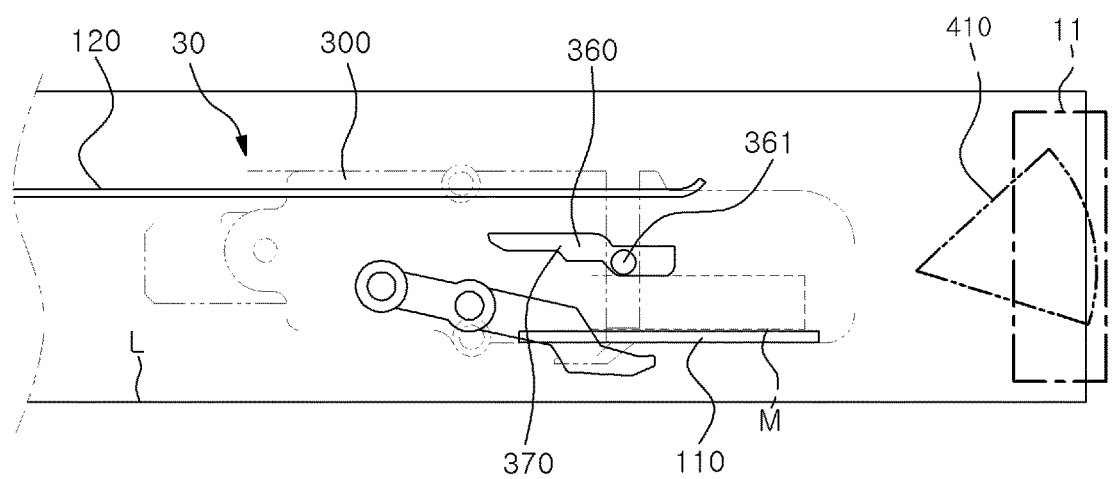
FIG. 9 shows a state in which the tray of the ATM according to the first embodiment of the present disclosure is moved to a deposit/withdrawal unit while clamping the medium.
Figure 10:
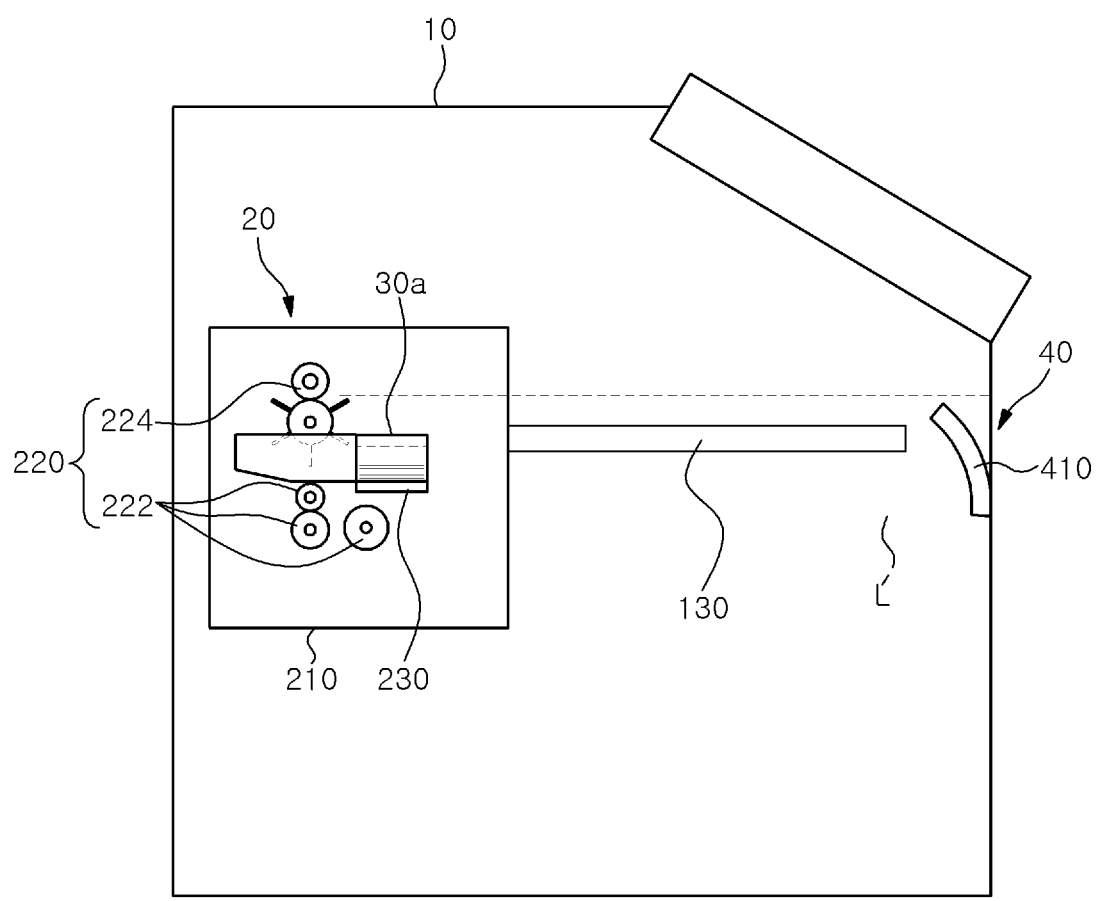
FIG. 10 is a conceptual view of an ATM according to a second embodiment of the present disclosure.

When the medium M stacked in the medium stacking space S is clamped by the clamping plate 360, the tray body 300 can be moved to the deposit/withdrawal unit 20 along the movement path L of the main body 2 as shown in FIG. 9.

At this time, even when a medium is overloaded in the tray 30, if the tray 30 passes through the guide bracket 120 in the movement path L, the clamping plate 360 can press the medium M downward and the height of the clamping plate 360 can be lowered.

Since the height of the clamping plate 360 is lowered, the tray 30 can move along the movement path L without interference between the clamping plate 360 and neighboring devices, and the falling of the medium M due to the weak pressing force of the clamping plate 360 can be prevented in advance.

Hereinafter, a second embodiment of the present disclosure will be described in detail with reference to FIGS. 10 to 16.

In the following description, like reference numerals will be given to like parts as those of the first embodiment, and redundant description thereof will be omitted.

As shown in FIGS. 10 to 17, an ATM 1a according to the second embodiment of the present disclosure is different from that of the first embodiment in that it includes a clamping lever 370a of a tray 30a, a height restriction bracket 130 for restricting a height of the clamping lever 370a, and an elevation unit 80a.

Figure 11:
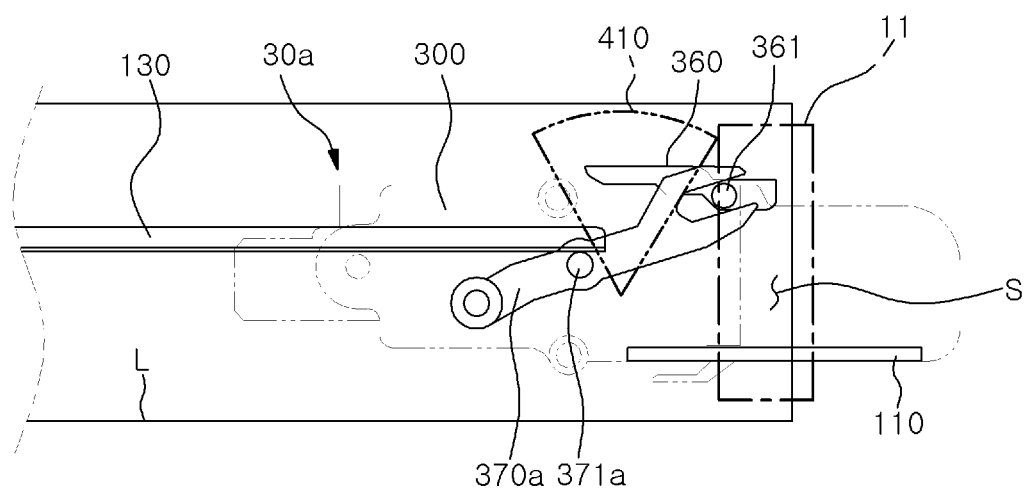
FIG. 11 is an enlarged side view of a tray of the ATM according to the second embodiment of the present disclosure.

As shown in FIG. 11, the tray 30a may include a tray body 300, a clamping plate 360, and a clamping lever 370a.

The tray body 300 can reciprocate in a horizontal direction along the movement path L of the main body 10. At this time, a bottom plate 110 for staking a medium may be provided on a bottom surface of the tray body 300.

The clamping plate 360 may be provided at the tray body 300 to be vertically movable. At this time, the clamping plate 360 may be disposed to face the bottom plate 110 provided at the bottom portion of the tray body 300, and an elevation protrusion 361 supported by the clamping lever 370a may project from the clamping plate 360.

As shown in FIGS. 12 to 15, if the clamping lever 370a is rotated upward (in a counterclockwise direction in FIG. 12) by a link member 810a of the elevation unit 80a in a state where the elevation protrusion 361 of the clamping plate 360 is restricted by the clamping lever 370a, the clamping plate 360 can be moved to a position above the tray body 300. At this time, the medium stacking space S may be generated in the space between the clamping plate 360 and the bottom plate 110 (see FIG. 11).

If the link member 810a of the elevation unit 80a is rotated downward (in the clockwise direction in FIG. 5) and the clamping lever 370a is rotated downward (in a clockwise in FIG. 14) in a state where the medium is stacked in the medium stacking space S, the clamping plate 360 can be moved downward by the rotation of the clamping lever 370a and clamp the medium stacked in the medium stacking space S.

The clamping lever 370a may be formed in a spanner to restrict the elevation protrusion 361 of the clamping plate 360. For example, one end of the clamping lever 370a may be hinge-coupled to the tray body 300 through a hinge shaft 373, and the other end of the clamping lever 370a may have a gripping groove 372 formed in a spanner shape that restricts the elevation protrusion 361 of the clamping plate 360. A lever protrusion 371a may project from a side portion of the clamping lever 370a to be supported by the link member 810a of the elevation unit 80a.

Figure 12:
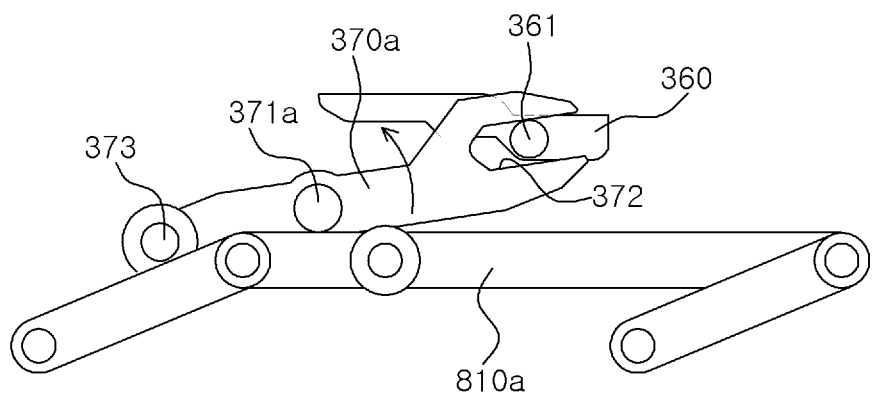
FIG. 12 shows a state in which a clamping plate is lifted by a clamping lever in the tray of the ATM according to the second embodiment of the present disclosure.

Accordingly, if the clamping lever 370a is rotated in the counterclockwise direction in FIG. 12 in a state where the gripping groove 372 of the clamping lever 370a restricts the elevation protrusion 361 of the clamping plate 360, i.e., in a state where the elevation protrusion 361 of the clamping plate 360 is inserted into the gripping groove 372 of the clamping lever 370a, the clamping plate 360 can be moved to a position above the tray body 300.

Figure 14:
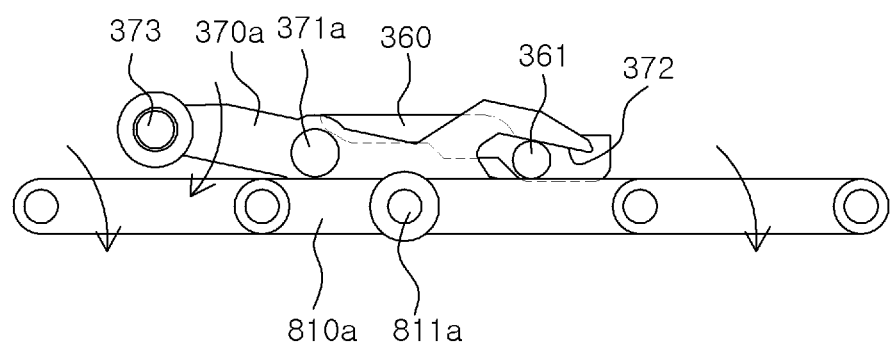
FIG. 14 shows a state in which the clamping plate is lowered by the clamping lever in the tray of the ATM according to the second embodiment of the present disclosure.

If the clamping lever 370a is rotated in the clockwise direction in FIG. 14 in a state where the gripping groove 372 of the clamping lever 370a restricts the elevation protrusion 361 of the clamping plate 360, i.e., in a state where the elevation protrusion 361 of the clamping plate 360 is inserted into the gripping groove 372 of the clamping plate 360, the clamping plate 360 can be moved to a low position in the tray body 300.

The operation of the clamping lever 370a can be implemented by the elevation unit 80a.

The elevation unit 80a may include the link member 810a provided at the main body 10 to support the clamping lever 370a, a rack piece 840a providing an inclined surface along which the link member 810a can be moved up and down, a pinion gear 830a for moving the rack piece 840a in a horizontal direction of the main body 10, and an actuator (not shown) providing a rotational force to the pinion gear 830a.

Here, the link member 810a may be configured as a four-bar linkage in which a plurality of link pieces is linked. At least a part of the link member 810a can support the elevation protrusion 361 of the clamping lever 370a. A link protrusion 811a may project from the link member 810a to be supported by the rack piece 840a.

The rack piece 840a may be provided at the main body 100 to be horizontally movable. A rack gear 841a engaged with the pinion gear 830a may be formed on the upper surface of the rack piece 840a. The rack piece 840a can move in a right-left direction in FIGS. 13 and 15 by the rotation of the pinion gear 830a.

The pinion gear 830a can receive a rotational force from the actuator. The actuator may be a driving motor that provides the rotational force to the pinion gear 830a through a belt (not shown).

Figure 13:
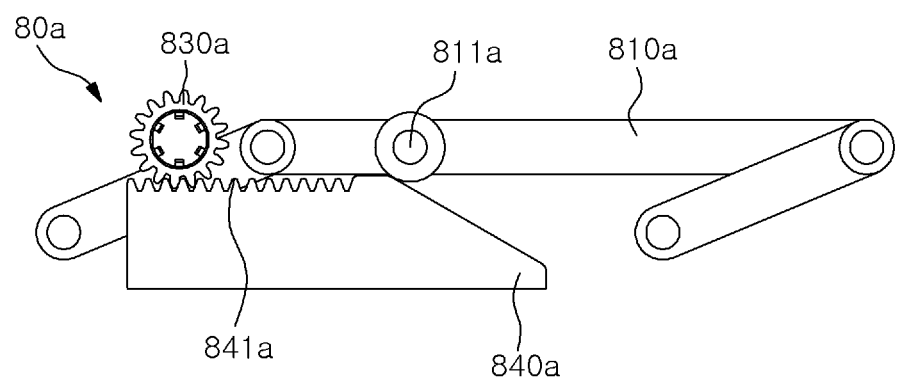
FIG. 13 shows a state in which a link member is lifted by a rack and pinion mechanism in the ATM according to the second embodiment of the present disclosure.

Therefore, if the rack piece 840a is moved to a right side in FIG. 13 by the rotation of the pinion gear 830a, the link protrusion 811a of the link member 810a is moved upward along the inclined surface of the rack piece 840a and, thus, the link member 810a is moved upward. At this time, the clamping lever 370a can move the clamping plate 360 upward by the upward movement of the link member 810a.

Figure 15:
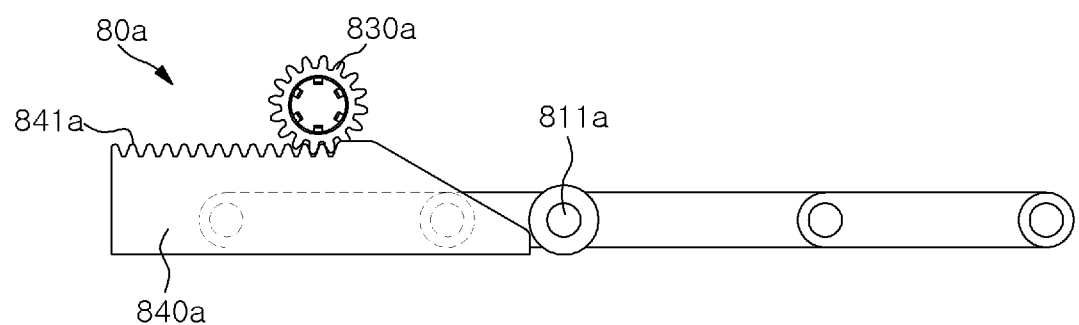
FIG. 15 shows a state in which the link member is lowered by the rack and pinion mechanism in the ATM according to the second embodiment of the present disclosure.

On the other hand, if the rack piece 840a is moved to a left side in FIG. 15 by the rotation of the pinion gear 830a, the link protrusion 811a of the link member 810a is moved downward along the inclined surface of the rack piece 840a and, thus, the link member 810a is moved downward. At this time, the clamping lever 370a can move the clamping plate 360 downward by the downward movement of the link member 810a.

The main body 10 may be provided with a height restriction bracket 130 for restricting a rotation height of the clamping lever 370a during the movement of the tray 30a below a preset height. The height restriction bracket 130 may project to an inner side of the movement path L of the main body 10 to restrict the maximum rotation height of the clamping lever 370a to the set height or less.

Therefore, even when the clamping plate 360 is positioned higher than the preset height due to overloading of the media in the tray 30a, if the tray 30a passes through the height restriction bracket 130 on the movement path L, the clamping plate 360 is lowered along the tray body 300 in a state where the rotation height of the clamping lever 370a for lifting/lowering the clamping plate 360 is guided by the height restriction bracket 130.

The height restriction bracket 130 can maintain the height of the clamping plate 360 at or below a certain height level while pressing the medium by controlling the rotation height of the clamping lever 370a. Accordingly, when the tray 30a moves along the movement path L, the tray 30a can move without interference between the clamping plate 360 and neighboring devices, and the falling of the medium due to the weak pressing force of the clamping plate 360 can be prevented in advance.

Hereinafter, the operation and the effect of the ATM configured as described above will be described.

First, as shown in FIG. 11, when the tray 30a is moved to the customer service unit 40, the tray body 300 of the tray 30a can provide the medium stacking space S so that a medium can be deposited through the customer service port 11.

For example, if the pinion gear 830a is rotated by the operation of the actuator in a state where the tray 30a is moved to the customer service port 11, the rack piece 840a is moved to the right side in FIG. 13 by the rotation of the pinion gear 830a, thereby moving the link member 810a upward. At this time, the clamping lever 370a moves the clamping plate 360 upward by the upward movement of the link member 810a. Accordingly, the medium stacking space S can be generated in the space between the clamping plate 360 and the bottom plate 360 as shown in FIG. 11.

Figure 16:
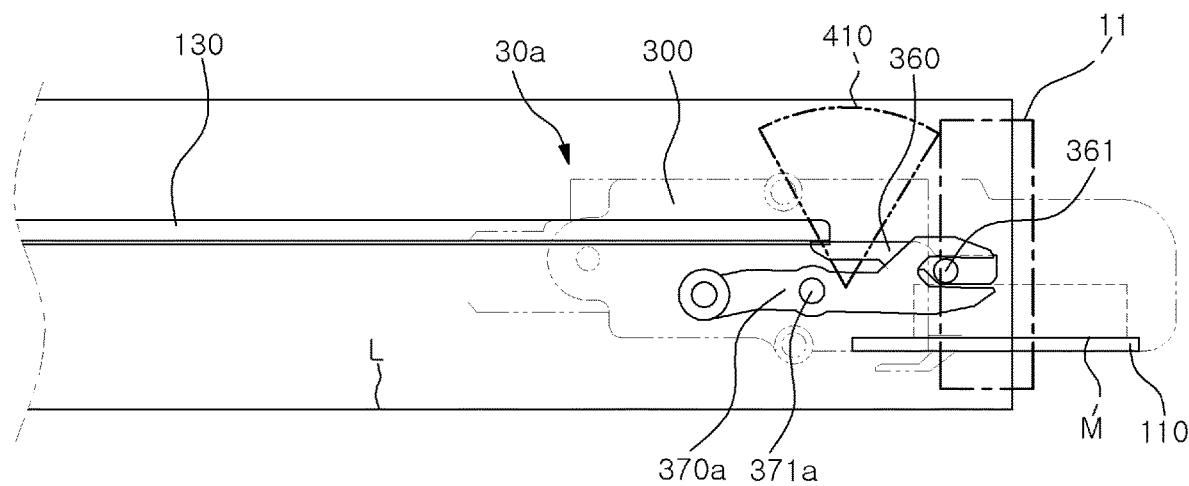
FIG. 16 shows a state in which a medium is clamped to the tray of the ATM according to the second embodiment of the present disclosure.

Then, if the medium is inserted into the medium stacking space S of the tray body 300, the medium inserted into the medium stacking space S can be clamped by the clamping plate 360 as shown in FIG. 16.

For example, if the pinion gear 830 is rotated by the operation of the actuator in a state where the medium is inserted into the medium stacking space S, the rack piece 840a is moved to the left side in FIG. 15 by the rotation of the pinion gear 830a, thereby moving the link member 810 downward. At this time, the clamping lever 370a moves the clamping plate 360 downward by the downward movement of the link member 810. Accordingly, the medium can be clamped in the space between the clamping plate 360 and the bottom plate 110 as shown in FIG. 16.

Figure 17:
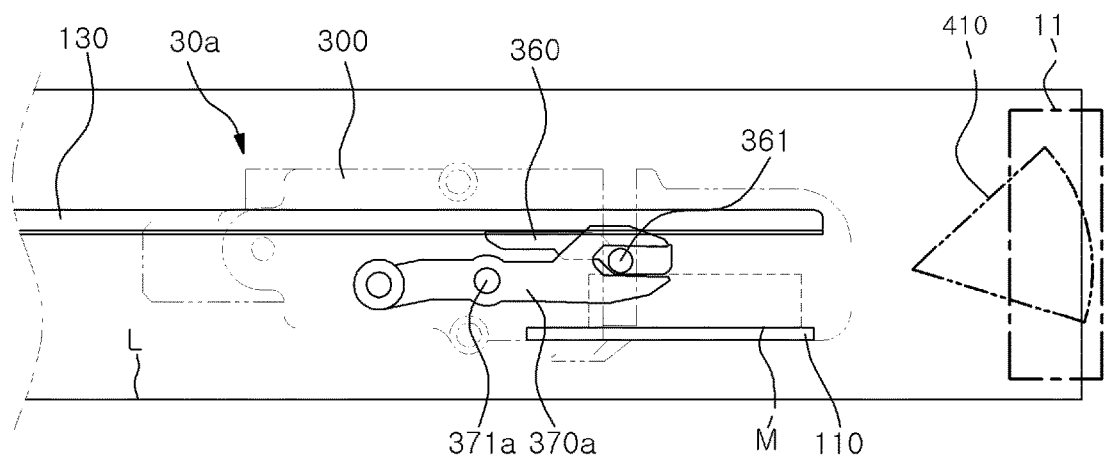
FIG. 17 shows a state in which the tray of the ATM according to the second embodiment of the present disclosure is moved to a deposit/withdrawal unit while clamping a medium.

When the medium M stacked in the medium stacking space S is clamped by the clamping plate 360, the tray body 300 can be moved to the deposit/withdrawal unit 20 along the movement path L of the main body 10 as shown in FIG. 17.

At this time, if the tray 30a passes through the height restriction bracket 130 of the movement path L, the height of the clamping plate 360 can be maintained at the preset height or less in a state where the rotation height of the clamping lever 370a for lifting/lowering the clamping plate 360 is guided by the height restriction bracket 130.

While the embodiments of the present disclosure have been described with reference to the accompanying drawings, it will be understood by those skilled in the art that the present disclosure can be implemented in other specific forms without changing the technical spirit or essential features of the present disclosure. For example, those skilled in the art can implement the present disclosure in the form that is not clearly described in the embodiments of the present disclosure by changing materials, sizes and the like of the respective components depending on application fields or by combining or replacing the embodiments without departing from the scope of the present disclosure. Therefore, it should be noted that the above-described embodiments are merely illustrative in all aspects and are not to be construed as limiting the present disclosure and also that the modifications are included in the technical spirit of the present disclosure which is described in the following claims.

What is claimed is:

1. An automated teller machine comprising:
    a main body including a customer service unit where a medium is inserted and taken out and a deposit/withdrawal unit where a medium is separated and stacked; and
    a tray configured to transfer the medium while reciprocating between the deposit/withdrawal unit and the customer service unit, wherein the tray includes:
a tray body that is movable between the customer service unit and the deposit/withdrawal unit;
a clamping plate provided at the tray body to be vertically movable to clamp the medium inserted into the tray body; and
a clamping lever configured to move the clamping plate upward so that a medium stacking space into which the medium is inserted is generated in the tray body; and
a link unit configured to move the clamping lever, wherein the link unit includes: a link member provided at the main body such that at least a part of the link member selectively supports the clamping lever; and a driving cam configured to lift/lower the link member,
wherein the clamping plate includes an elevation protrusion that projects from a side portion thereof to be lifted by the clamping lever.

2. The automated teller machine of claim 1, wherein the driving cam includes a guide groove formed in a spiral shape toward a center of rotation of the driving cam to guide the lifting/lowering of the link member during the rotation of the driving cam.

3. The automated teller machine of claim 1, wherein the clamping lever is hinge-coupled to the tray body so that at least a part of the clamping lever supports the elevation protrusion.

4. The automated teller machine of claim 3, wherein the clamping lever includes a lever protrusion that projects from a side portion thereof to be supported by the link member.

5. The automated teller machine of claim 1, wherein the main body includes a guide bracket projecting on a movement path of the tray body,
wherein a height of the clamping plate is restricted to a preset height or less when the tray body is moved by the guide bracket.

6. An automated teller machine comprising:
a main body including a customer service unit where a medium is inserted and taken out and a deposit/withdrawal unit where a medium is separated and stacked; and
a tray configured to transfer the medium while reciprocating between the deposit/withdrawal unit and the customer service unit,
wherein the tray includes:
a tray body that is movable between the customer service unit and the deposit/withdrawal unit;
a clamping plate provided at the tray body to be vertically movable to clamp the medium inserted into the tray body; and
a clamping lever having a gripping groove for restricting at least a part of the clamping plate to move the clamping plate upward and downward; and
wherein the clamping plate includes an elevation protrusion that projects from a side portion thereof to be lifted by the clamping lever.

7. The automated teller machine of claim 6, wherein the main body includes a height restriction bracket projecting on a movement path of the tray body to restrict a rotation height of the clamping lever to a preset height or less.

8. The automated teller machine of claim 6, wherein the clamping lever has one end hinge-coupled to the tray body and the other end having the gripping groove that restricts the elevation protrusion.

9. The automated teller machine of claim 6, wherein the main body further includes an elevation unit configured to operate the clamping lever at the customer service unit.

10. The automated teller machine of claim 9, wherein the elevation unit includes:
a link member provided at the main body such that at least a part of the link member selectively supports the clamping lever;
a rack piece that is movable in a horizontal direction and provides an inclined surface along which the link member is moved up/down; and
a pinion gear configured to move the rack piece.

11. The automated teller machine of claim 10, wherein the clamping lever includes a lever protrusion that projects from a side portion thereof to be supported by the link member.

* * * * *